Feb. 27, 1934.   S. T. LESTER   1,949,280
MEASURING APPARATUS
Filed Dec. 8, 1928   2 Sheets-Sheet 1
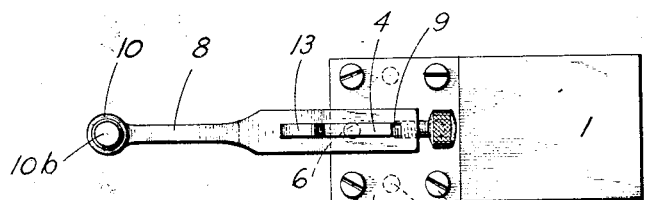
Fig. 1
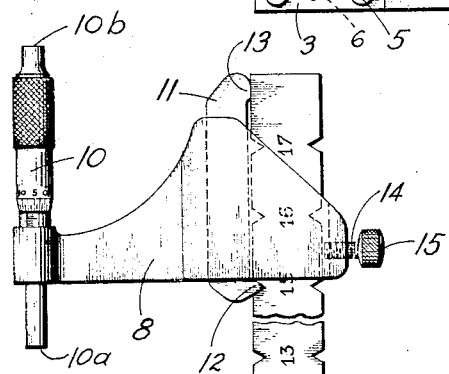
Fig. 2
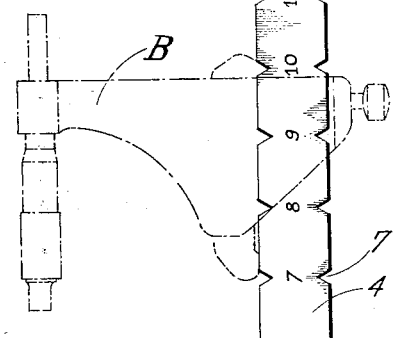
Fig. 3
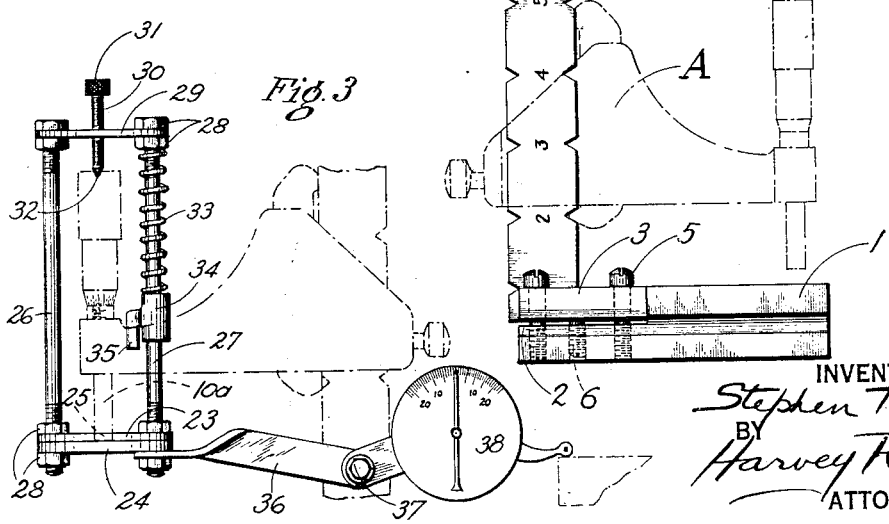
INVENTOR
Stephen T. Lester
BY
Harvey R. Hawgood
ATTORNEY Feb. 27, 1934.                S. T. LESTER                 1,949,280
                          MEASURING APPARATUS
                         Filed Dec. 8, 1928          2 Sheets-Sheet 2

INVENTOR
Stephen T. Lester
BY
Harry R. Hawgood
ATTORNEY

Patented Feb. 27, 1934

1,949,280

UNITED STATES PATENT OFFICE 1,949,280

MEASURING APPARATUS

Stephen T. Lester, Cleveland, Ohio

Application December 8, 1928. Serial No. 324,643

9 Claims. (Cl. 33—165)

This invention relates to adjustable gauges and is particularly adaptable to gauges which are used for accurately measuring distances, as is required in conjunction with machine operations and the like.

It is an object of the invention to provide a gauge which may be adjusted to measure a relatively large variety of sizes of articles with great accuracy.

Another object is to provide an adjustable gauge which will be simple both in construction and operation.

Other objects will hereinafter appear.

The invention will be better understood from the description of the practical embodiments thereof illustrated in the accompanying drawings, in which—

Figure 1 is a plan view of a height gauge embodying the invention;

Figure 2 is a side elevation thereof;

Figure 3 is a side elevation of an attachment to permit the use of an indicator with the apparatus of Figures 1 and 2;

Figure 4:
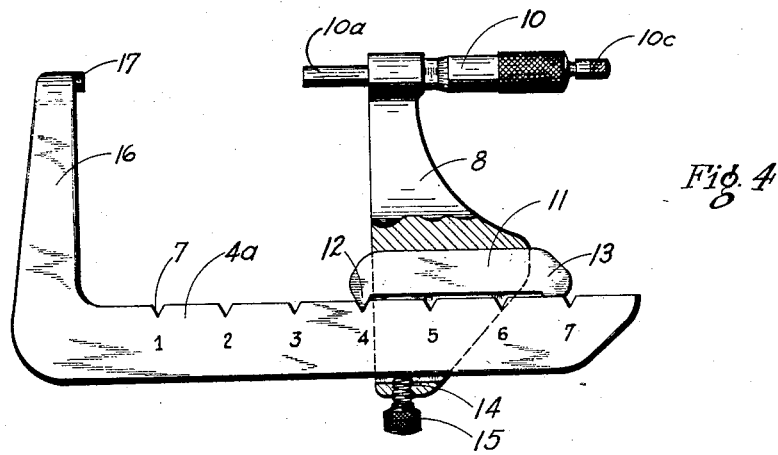
Figure 4 is a side elevation, with parts broken away, of a caliper embodying the invention.

This application is a continuation in part of my two co-pending applications, identified as follows: calipers, filed December 5, 1925, Serial No. 73,409, and combined height gauge and calipers, filed May 26, 1926, Serial No. 111,785, as to all subject matter common to them and this application.

Referring first to the height gauge of Figures 1 and 2, the gauge comprises a supporting base 1 consisting of a rectangular block recessed at 2 to receive the foot 3 of a blade or beam 4 on which the measuring mechanism is carried. The upper and lower surfaces of the base are plane and parallel to each other. The foot 3 is secured to the base by a number of cap screws 5, four being shown, these being preferably positioned near the corners of the foot, and is adjustable toward and from the base and angularly with respect thereto by set screws 6 threaded through the base beneath the foot and intermediate the retaining screws 5, so that the blade may be accurately positioned above the base both as to height and angularity, the correct adjustment being effected when the edges of the blade are normal to the lower surface of the base and its height is such that the measuring mechanism will accurately indicate distances from the plane of said surface of the base.

As the blade is normal to the surface of the base, the blade and base may be used in the manner of a square, if desired, although this is not the main purpose of the device.

The blade is provided with a series of V-shaped notches 7 on each edge thereof which are arranged to locate the carrier 8 which carries the measuring device, and to constitute a coarse adjustment of the apparatus.

The carrier 8 consists of an outwardly extending arm provided at one side with an elongated slot 9 through which the blade or beam may slide. At the other end is provided means for retaining the measuring mechanism by which small variations of distance are measured.

The above referred to measuring mechanism is shown as a micrometer head 10 secured within a hole through the outer end of the carrier with its axis parallel that of the blade, but, of course, it will be obvious that a vernier or other accurately measuring instrument may be used, and that it may be mounted in any desired manner. The micrometer head shown in Figures 1 and 2 is provided with the usual measuring shank 10a, while an anvil 10b is adjustably secured in the end of the handle opposite this shank and adjusted so that distances may be indicated by it as well as by the shank. Obviously the most convenient adjustment will be to make the distance from the end of the shank to the end of the anvil an exact multiple of the distance between notches.

In the side of slot 9 toward the micrometer head is positioned a bearing member 11 which is rigidly and permanently fixed to the carrier as by rivets, welding or any desired means. The bearing member is provided at one end with a projecting V-shaped tooth or finger 12, and on the other end with a projecting flat bearing surface or heel 13, the tooth being adapted to selectively engage any notch in the blade and having its point removed so that dirt in the notch will not prevent its proper seating therein, and the heel being adapted to engage the vertical surface of the blade intermediate the notches.

A set screw 14, conveniently provided with a knurled head 15, is threaded through the portion of the carrier at the side opposite the bearing member and is used to clamp the bearing member upon the blade.

It will be noted that the heel engages a comparatively short space upon the surface of the blade and that this space is adjacent one of the notches rather than being centrally disposed between adjacent notches, and that the bearing so afforded is spaced from the notch engaged by the tooth a considerable distance, shown as about equal to the length of the extending part of the carrier. Due to the tooth engaging the V-shaped notch and bearing upon both sides thereof and the heel engaging a flat surface and also to the relatively great distance between these bearings, the carrier may be firmly and accurately clamped to the blade, and, also due to the above, the notches may be accurately located, as, if any notch is a trifle above or below its desired position, it is only necessary to lap or grind the side thereof toward which the notch should be moved thus increasing the depth of the notch and moving its median line in the desired direction. At the same time a bit of the vertical surface of the blade should be lapped or ground away where the heel of the bearing member will engage when the tooth is in the notch being corrected, so that the carrier will not be tilted with respect to the blade. This removal of material from the vertical surface does not affect the support of the carrier when in any other position. The carrier is then inverted and the portion of the blade engaged by the heel in this position when the tooth is in the notch being corrected is similarly treated.

Obviously it will be convenient to have the notches spaced apart by the distance of the extensibility of the measuring device, for instance when a one inch micrometer head is used, the notches are one inch apart, the first being one inch above the plane of the bottom of base 1. The micrometer is then adjusted in the carrier so that when it is made to indicate one inch it is exactly level with the tooth and consequently accurately indicates fractions of an inch above the notch immediately below the tooth, the number of notches below the tooth indicating the inches measured. Of course the notches may be provided with numbers or other indicia so that they need not be counted.

The notches at the side of the blade shown at the right in Figure 2 are arranged and made accurate in the same manner as those shown to the left in this figure. By having the base exactly one inch thick these notches may be brought directly opposite those first described. The carrier may be turned around so that the bearing member engages the right hand side of the blade as shown at A and used either as a height gauge indicating distances above the top of the base or as a caliper in which the base constitutes the anvil.

The carrier may also be inverted from either the position shown in full lines or that of A, as indicated at B, so that the shank 10a will fit under surfaces instead of over them.

Obviously unitary readings may be obtained in a number of positions. For example, in the apparatus shown in which a one inch micrometer head is used and the notches are one inch apart and the base one inch thick, assuming the length from the end of shank 10a to the end of anvil 10b to be four inches, a six inch indication may be obtained when the carrier is arranged as shown in full lines in four positions;—namely, at the end of shank 10a when the head is set at zero and the tooth is in notch (left hand) 7; at the end of the shank when the head is set at one inch and the tooth is in left hand notch 6; at the end of anvil 10b when the head is set at zero and the tooth is in notch (left hand) 3; and at the end of the anvil when the head is set at one inch and the tooth is in left hand notch 2. Four more six inch indications may be similarly obtained with the carrier arranged as at B, the notches used being respectively left hand notches 5, 6, 9, and 10. Again, four other six inch readings are possible with the carrier arranged as at A, using right hand notches 8, 7, 4, and 3, respectively, while with the carrier inverted from this position, right hand notches 6, 7, 10, and 11 are used.

The large number of indications possible for a single distance not only permits many arrangements for the convenience of the operator but allows the checking of the accuracy of a large number of notches and of the alinement of the blade and adjustment of the measuring device by comparison with a single accurate standard, as a standard block, and any inaccuracy occurring in use may be easily detected and eliminated.

In Figure 4 a caliper is shown in which a blade 4a carries at one end an integral projection 16 having an anvil 17 in axial alinement with the micrometer head. The blade is provided with notches 7a along its upper edge and with a carrier and micrometer head identical to those above described except that a ratchet 10c is substituted for anvil 10b. A coarse adjustment is, of course, effected as above described by moving the carrier along the blade and a fine adjustment by operation of the micrometer head.

Figure 5:
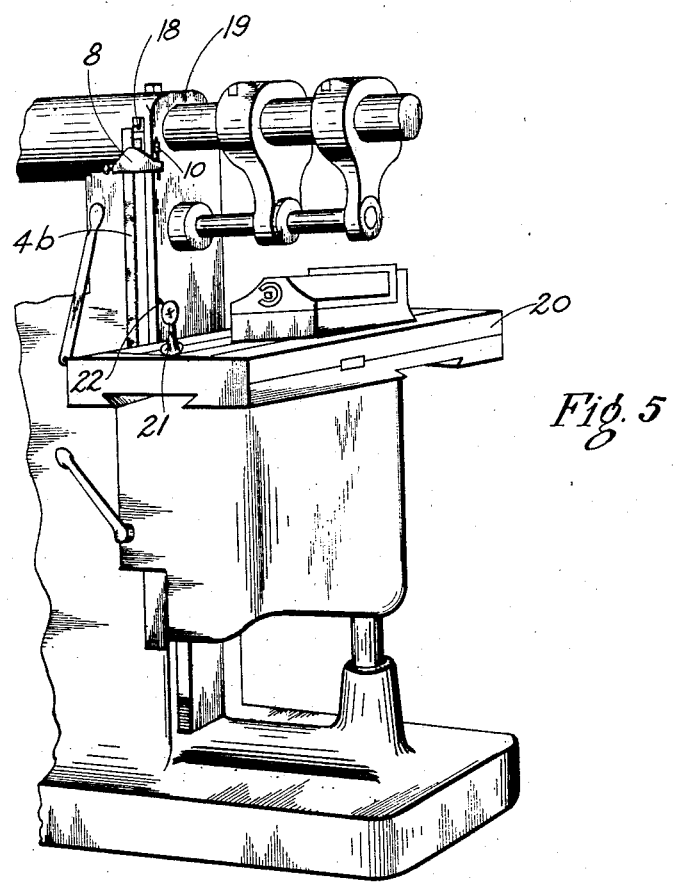
Figure 5 is a fragmentary perspective view of a gauge permanently applied to a machine.

In Figure 5 another embodiment is illustrated, in which a blade 4b is permanently carried by brackets 18 upon the stationary part of a machine. Upon the blade is a carrier provided with a micrometer head like those above described. Upon the movable table 20 of the machine may be positioned a device shown as a dial indicator 21 in such a position that a part such as actuating finger 22 may be engaged by the micrometer head and changes in the elevation of the table very accurately ascertained.

In Figure 3 an attachment is illustrated which may be used with any of the above described forms of apparatus, but is particularly useful with that of Figures 1, 2 and 5. The attachment consists of a frame which may be secured to the micrometer head so that it may be moved by adjustment of the head, and upon which a dial indicator or the like may be adjustably carried.

The frame shown has a socket consisting of two superposed plates 23 and 24, the upper of which is apertured at 25 to receive the end of shank 10a of the micrometer head. Two upwardly extending rods 26 and 27 extend through perforations in the ends of the plates and are secured to them by nuts 28. At the upper ends of the rods is carried, in a similar manner, another plate 29, through which is threaded a set screw 30 having a knurled head 31 and a pointed end 32, to engage a central recess in the upper end of the micrometer head.

Around rod 27 is a helical compression spring 33 which bears upon a sleeve 34 slidable upon the rod. The sleeve has a hook like extension 35 which is adapted to embrace the carrier 8 and prevent the attachment from rotating as the micrometer head is adjusted, the sleeve and spring allowing the frame to move with the head longitudinally. An arm 36 has a perforated end which is clamped to rod 27 by nuts 28 so that it may be adjusted about the axis of the rod by loosening the nuts, and the other end of the arm is perforated in a direction normal to the rod and carries, adjustably, by a bolt 37, a dial indicator 38 which may be of any desired type. The hook holds the frame in such a position that the indicia of the micrometer head may be easily seen.

While I have described the illustrated embodiments of my invention in some particularity, obviously many variations and modifications will readily occur to those skilled in the art to which this appertains, and I do not, therefore, limit myself to the precise details shown and described, but claim as my invention all embodiments coming within the scope of the appended claims.

I claim:

1. Measuring apparatus comprising a beam having a series of notches in one edge, a carrier movable along said beam and having two projections spaced slightly less than a multiple of the distance between successive notches and arranged to contact said edge, one projection selectively engaging the notches and one engaging the edge intermediate notches, clamping means retaining said projections against said edge of the beam, and a measuring device carried by the carrier and arranged to indicate a base reading when its end lies in a plane normal to said edge and passing through the projection engaged notch.

2. Measuring apparatus comprising a beam having a series of notches in one edge, a carrier movable along said beam and having two spaced projections rigidly fixed thereto and arranged to contact said edge, one projection selectively engaging the notches and the other engaging the edge adjacent a notch remote from that engaged by the first mentioned projection, clamping means retaining the carrier with the projections against said edge of the beam, and a measuring device adapted to indicate small distances and carried by the carrier.

3. In a measuring apparatus, an element for indicating small distances, a carrier therefor, a beam along which said carrier is adjustable, the carrier having two spaced fixed projections contacting one edge of said beam, and an adjustable projection engaging the opposite edge of the beam, the first mentioned edge of the beam being provided with a series of notches, one of the first mentioned projections having wedging engagement with said notches for positively locating it longitudinally of the beam.

4. Measuring apparatus comprising a beam having a series of V-shaped notches in an edge thereof, an element for indicating small distances, a carrier for said element movable along the beam, the carrier having a shoe with two contacting surfaces one of which engages the notches selectively and the other of which bears upon the beam between notches, and a locking means on said carrier engaging the opposite edge of the beam to press the contacting surfaces and the shoe against the beam.

5. A measuring apparatus comprising a beam having a series of V-shaped notches in one edge, a device for indicating small distances, a carrier therefor, movable longitudinally along the beam, the carrier having a shoe rigidly secured thereto and provided with two contacting surfaces, one of which engages the notches selectively and the other of which bears upon the beam between notches, the shoe being on the side of the carrier adjacent the measuring device, and a set screw on the opposite side of the carrier pressing the edge of the beam opposite that engaged by the shoe.

6. Measuring apparatus comprising a base having plane parallel upper and lower surfaces, a notched beam normal to said surfaces having a foot and means to adjustably clamp said foot to said base, the beam being notched along one edge at uniform intervals, each interval being an even integral number of units of measurement from the lower surface of the base, the beam being notched along its opposite edge at uniform intervals similarly related to the upper surface of the base, a carrier adjustably carried by the beam and having a projection selectively engaging the beam at any notch on either edge thereof, and a second projection spaced therefrom engaging the same edge intermediate notches to positively locate the carrier, and an adjustable measuring device carried by the carrier.

7. Measuring apparatus comprising a base having plane parallel upper and lower surfaces, a beam normal to said surfaces having a foot and means to adjustably clamp said foot to the base, the beam being notched along one edge at uniform intervals, each interval being an even integral number of units of measurement from the lower surface of the base, the beam being notched along its opposite edge at uniform intervals similarly related to the upper surface of the base, a carrier adjustably carried by the beam and having a projection selectively engaging the beam at any notch on either edge, and a second projection bearing on the beam between notches, the projections being rigidly secured to the carrier to positively locate the carrier, and a mircrometer head carried by the carrier and having measuring anvils at each end so adjusted as to indicate a base reading from the plane of one surface of the base when the first mentioned projection is in engagement with the beam at one of the notches.

8. Measuring apparatus comprising a beam having a notched edge, a carrier movable upon the beam, a measuring device for indicating small distances supported by the carrier, the carrier having two spaced projections rigidly fixed thereto and engaging the beam at points remote from each other, one of the projections having selective wedging engagement with said beam at any notch to positively locate the carrier, and clamping means pressing the projections against the beam.

9. Measuring apparatus comprising a beam, a carrier adjustable therealong, a micrometer head carried by the carrier, a frame carried by the micrometer head to move longitudinally therewith, and a spring pressed hook carried by the frame and engaging the carrier.

STEPHEN T. LESTER.